US008125672B2

(12) United States Patent
Chauvin et al.

(10) Patent No.: US 8,125,672 B2
(45) Date of Patent: Feb. 28, 2012

(54) DUAL INK SYSTEMS IN A PRINTER

(75) Inventors: James A. Chauvin, Frederick, CO (US); Jeffrey H. Paterra, Longmont, CO (US); Joan L. Mitchell, Longmont, CO (US)

(73) Assignee: InfoPrint Solutions Company LLC, Boulder, CO (US)

(*) Notice: Subject to any disclaimer, the term of this patent is extended or adjusted under 35 U.S.C. 154(b) by 620 days.

(21) Appl. No.: 12/356,683

(22) Filed: Jan. 21, 2009

(65) Prior Publication Data

US 2010/0182358 A1 Jul. 22, 2010

(51) Int. Cl.
*G06F 3/12* (2006.01)
*H04N 1/46* (2006.01)

(52) U.S. Cl. ....................................... 358/1.15; 358/502

(58) Field of Classification Search ................. 358/1.15, 358/468, 500, 501, 502, 1.8; 400/582; 399/385; 709/224; 382/173, 181, 190, 191, 192, 199, 382/203, 217

See application file for complete search history.

(56) References Cited

U.S. PATENT DOCUMENTS

| | | | | |
|---|---|---|---|---|
| 6,352,327 | B1 | 3/2002 | Yano et al. | |
| 6,568,785 | B1 | 5/2003 | Edelen et al. | |
| 7,244,019 | B2 | 7/2007 | Watanabe | |
| 2002/0138612 | A1* | 9/2002 | Sekizawa | 709/224 |
| 2003/0050873 | A1* | 3/2003 | Niki | 705/28 |
| 2005/0270323 | A1 | 12/2005 | Oshio et al. | |
| 2006/0082609 | A1* | 4/2006 | Walmsley et al. | 347/14 |
| 2008/0112746 | A1* | 5/2008 | Yamamoto | 399/385 |
| 2008/0124158 | A1* | 5/2008 | Folkins | 399/396 |
| 2010/0329765 | A1* | 12/2010 | Ruhm et al. | 400/582 |

FOREIGN PATENT DOCUMENTS

JP 2005067001 3/2005

* cited by examiner

*Primary Examiner* — Jerome Grant, II

(74) *Attorney, Agent, or Firm* — Blakely, Sokoloff, Taylor & Zafman LLP

(57) ABSTRACT

An ink jet printing system includes a first print system having a first ink system to print received print jobs, a second print system having a second ink system independent of the first ink system to print the print jobs and a control unit to receive the print jobs and determine which of the first and second print systems is to print each received print job.

14 Claims, 5 Drawing Sheets

DUAL INK SYSTEMS IN A PRINTER

FIELD OF THE INVENTION

The invention relates generally to the field of ink-jet printing systems. More particularly, the invention relates to an ink-jet printer having multiple ink systems.

BACKGROUND

An ink jet printer is as an example of a printing apparatus that ejects droplets of ink onto a recording medium such as a sheet of paper, for printing an image of the recording medium. The ink jet printer includes a head unit having an ink jet head provided with an ink cartridge that accommodates the ink. In operation of the head unit, the ink is supplied from the ink cartridge to each ink jet head having ejection nozzles, so that a printing operation is performed by ejection of the ink droplets from selected ejection nozzles.

There are two general types of ink used in inkjet printers, dye-based ink and pigment-based ink. However, dye-based and pigment-based ink types are not interchangeable. Each ink type offers specific advantages over the other. In general dye inks tend to be cheaper but offer lower print quality than pigment inks.

Switching a print engine from operating using one ink type to operating with the other ink type necessitates a long and expensive process, and is generally not even considered as practical for production print houses. Therefore, a print house must choose one ink type for its printing operation, or purchase and operate two printers (one for each ink type) in order to have an ability to print using both print ink types.

However, high speed ink jet production printers may have a purchasing price as high as $3 million, which may limit the ability of some printing houses to operate printers that print using each ink type.

Accordingly, an ink-jet printer capable of efficiently operating with multiple ink types is desired.

SUMMARY

In one embodiment, an ink jet printing system is disclosed. The printing system includes a first print system having a first ink system to print received print jobs, a second print system having a second ink system independent of the first ink system to print the print jobs and a control unit to receive the print jobs and determine which of the first and second print systems is to print each received print job.

Another embodiment discloses a method of receiving a print job at a control unit within an ink jet printer, the control unit determining that the print job is to be printed at a first print system having a first ink system if the print job indicates that a first ink type is to be used for the print job and the control unit determining that the print job is to be printed at a second print system having a second ink system if the print job indicates that a second ink type is to be used for the print job.

A further embodiment discloses a network. The network includes one or more data processing systems, a print server to receive print jobs from each of the one or more data processing systems and an ink jet printer to receive the print jobs from the print server. The ink jet printer includes a first print system having a first ink system to print received print jobs, a second print system having a second ink system independent of the first ink system to print the print jobs and a control unit to receive the print jobs and determine which of the first and second print systems is to print each received print job.

BRIEF DESCRIPTION OF THE DRAWINGS

A better understanding of the present invention can be obtained from the following detailed description in conjunction with the following drawings, in which.

DETAILED DESCRIPTION

A dual ink print system mechanism for ink jet printer is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
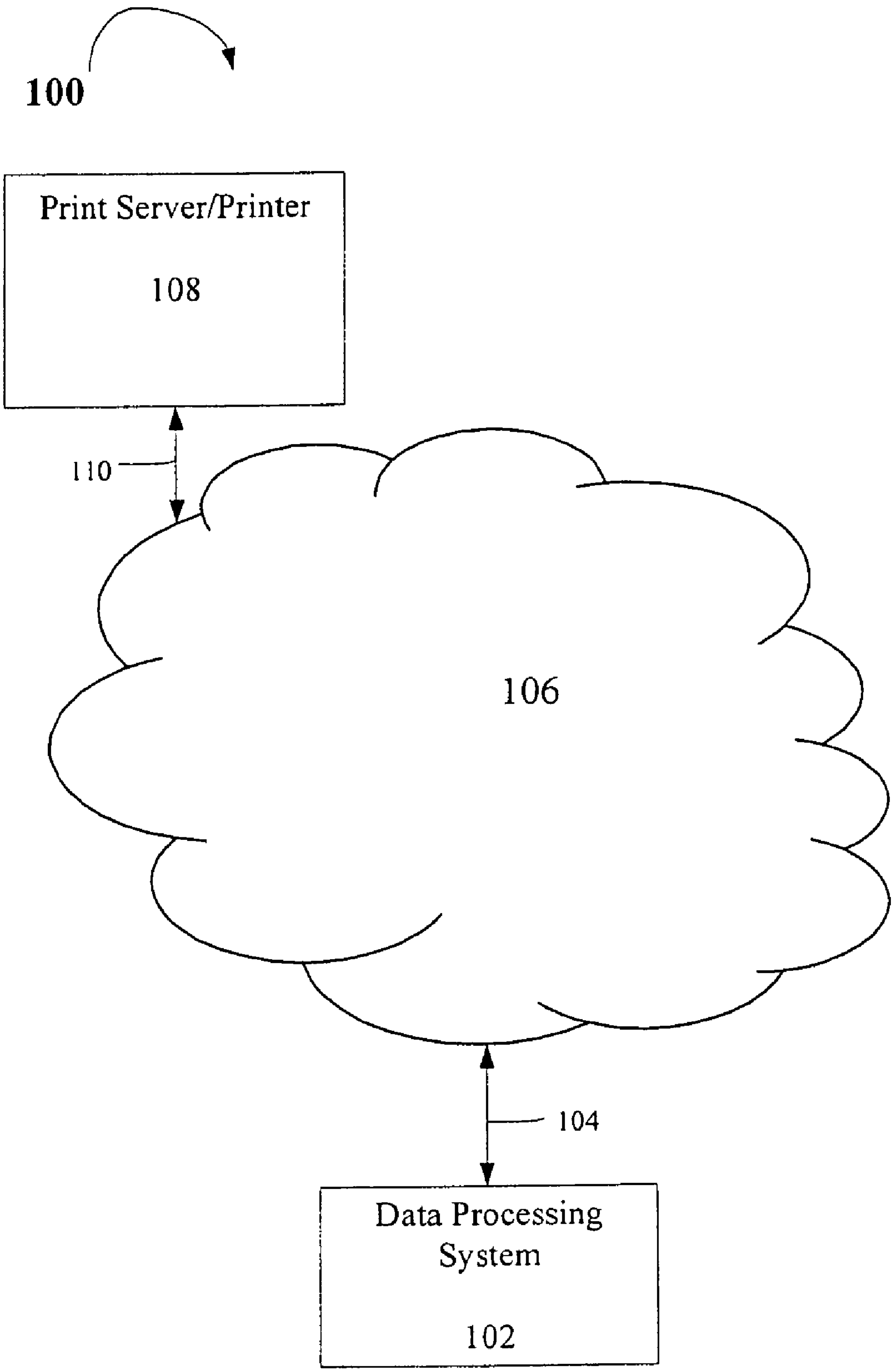
FIG. 1 illustrates one embodiment of a data processing system network.

FIG. 1 illustrates one embodiment of a data processing system network 100. Network 100 includes a data processing system 102, which may be either a desktop, host computer or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system or a similar operating system and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server/printer 108 serving print requests over network 106 received via communications link 110 between print server/printer 108 and network 106. The operating system on data processing system 102 is capable of selecting print server/printer 108 and submitting requests for services to print server/printer 108 over network 106. Print server/printer 108 includes a print queue for print jobs requested by remote data processing systems 102. Further, print server/printer 108 includes a control unit to perform operations associated with printing a request.

Although described as incorporated within the same entity, other embodiments may include the print server and the printer as being physically separate components. Therefore, the data processing system network 100 depicted in FIG. 1 is selected for the purposes of explaining and illustrating the present invention and is not intended to imply architectural limitations. Those skilled in the art will recognize that various additional components may be utilized in conjunction with the present invention.

Figure 2:
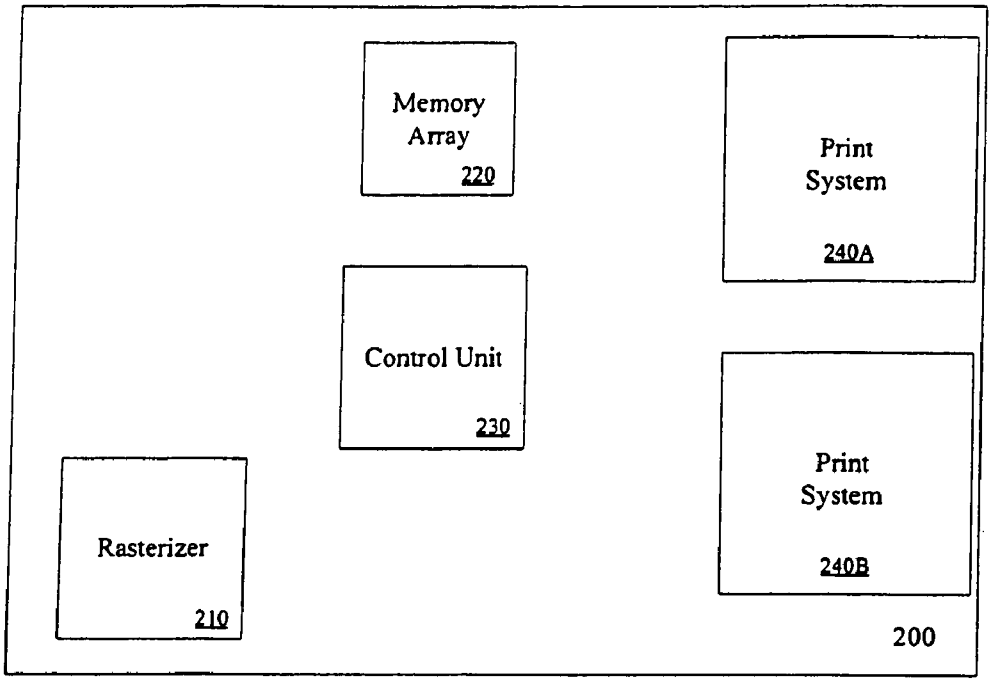
FIG. 2 illustrates one embodiment of an ink jet printer.

FIG. 2 illustrates one embodiment of an ink jet printer 200. In one embodiment, ink jet printer 200 is implemented as the printing component of print server/printer 108. Printer 200 includes a rasterizer 210, memory array 220, control unit 230 and print systems 240A and 240B.

Rasterizer 210 is implemented to convert vector information received at printer 200 into a raster format. Particularly, rasterizer 210 generates a raster scan of a received image that is to be stored as scan line data in memory array 220. Control unit 230 controls the operation of print systems 240A and 240B. According to one embodiment, print systems 240A and 240B each utilize independent ink systems to perform a print job directed by control unit 230.

As a result, control unit 230 determines which of the print systems 240 is to perform a print job based on a predetermined operation selection. In such an embodiment, print system 240A performs print jobs utilizing a dye-based ink, while print system 240B is used for print jobs calling for pigment-based ink, or a custom ink. Thus, based on the type of ink to be used for the print job, control unit 230 selects the applicable print system 240.

In another embodiment, print systems 240A and 240B utilize the same ink type. In this embodiment, one print system (e.g., 240A) is used for continuous printing while the other (e.g., 240B) serves as a backup. At certain intervals, or when needed, print system 240B will be used when print system 240A is taken offline for maintenance and servicing. Thus, printer 200 is always available for use, even during servicing. In a further embodiment both independent print systems 240A and 240B within printer 200 may be used so that ink from both systems may be used on the same page of a print job.

Figure 3:
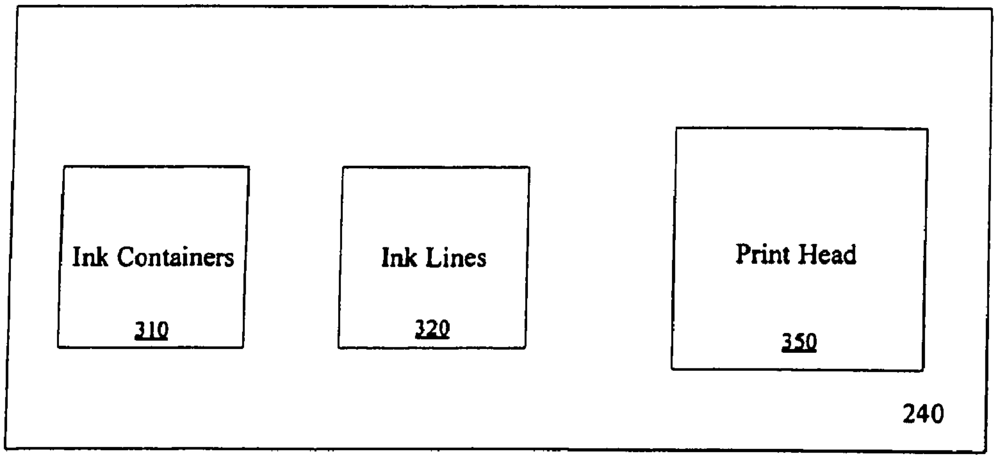
FIG. 3 illustrates one embodiment of a print system.

FIG. 3 illustrates one embodiment of a print system 240. In one embodiment, each print system 240 includes ink containers 310, ink lines 320 and a print head 350. Ink containers 310 include one or more ink colors that supply one or more ink reservoirs to print head 350 via ink lines 320. In one embodiment, ink containers 310 are bottles. However in other embodiments, ink containers 210 may be a bladder, cartridge or other type of supply containers.

Print head 350 includes a printing element that prints to a print medium. According to one embodiment, print head 350 is a wide-array inkjet print head that employs multiple sets of nozzles that are implemented to spray droplets of ink onto a sheet of paper in order to execute a print job. However, print head 350 may include other types of ink jet print heads, as well as a moving print head design.

Figure 4:
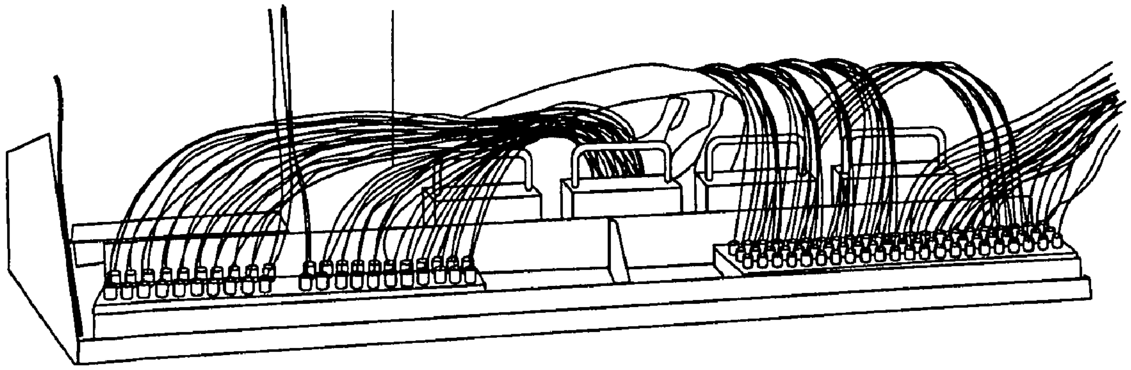
FIG. 4 illustrates a high speed ink jet printer.

FIG. 4 illustrates an exemplary high speed ink jet printer employing a single print system. As shown in FIG. 4, the print system includes a single set of ink lines and a print head with nozzles.

Figure 5:
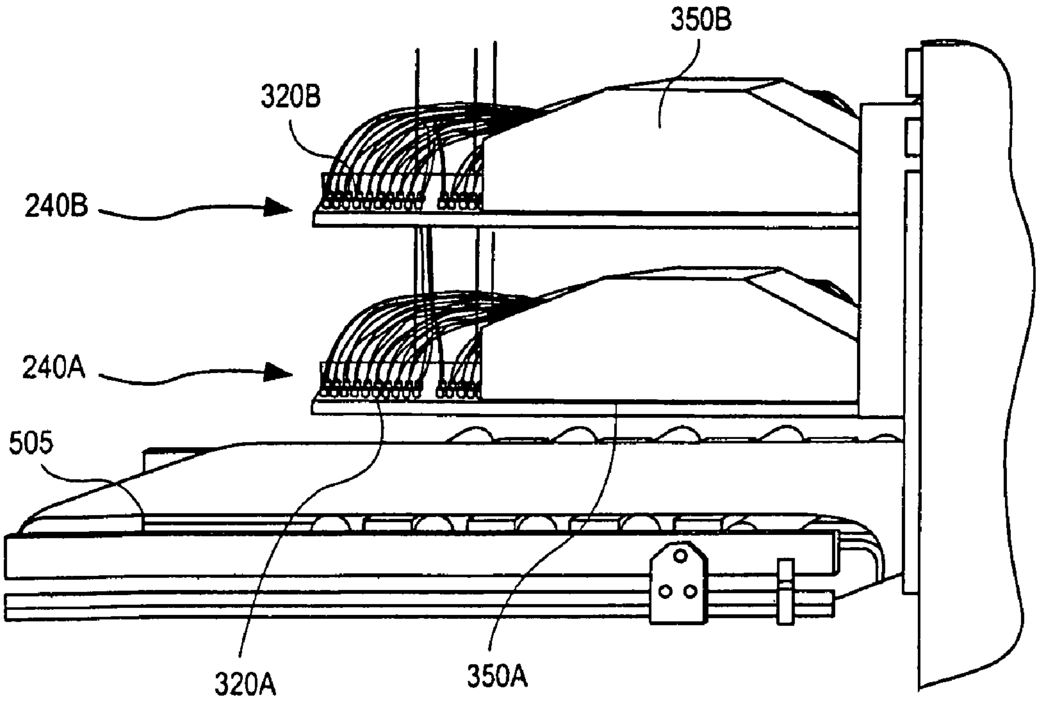
FIG. 5 illustrates one embodiment of a high speed ink jet printer.

FIG. 5 illustrates one embodiment of a high speed ink jet printer employing dual print systems 240A and 240B. In this embodiment, the print heads 350A and 350B are covered by respective docking stations. In the embodiment shown in FIG. 5, the two sets of print heads 350A and 350B are docked vertically. In this embodiment, the docking stations move in a vertical direction to lower the second set of print heads 350B such that they are at a proper height for moving into the ready position over a paper path 505.

Figure 6:
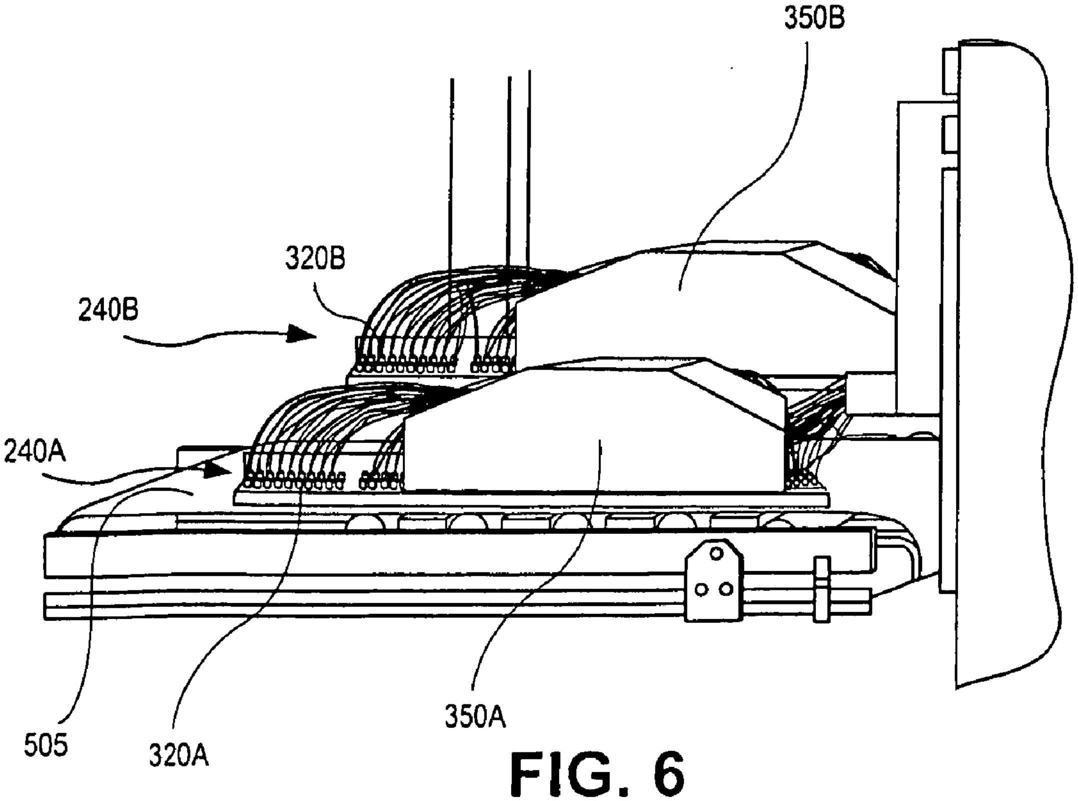
FIG. 6 illustrates another embodiment of a high speed ink jet printer.

FIG. 6 illustrates another embodiment of a high speed ink jet printer employing dual print systems 240A and 240B. In this embodiment, print heads 350A and 350B with their respective docking stations are oriented on each side of the paper path 505.

Figure 7:
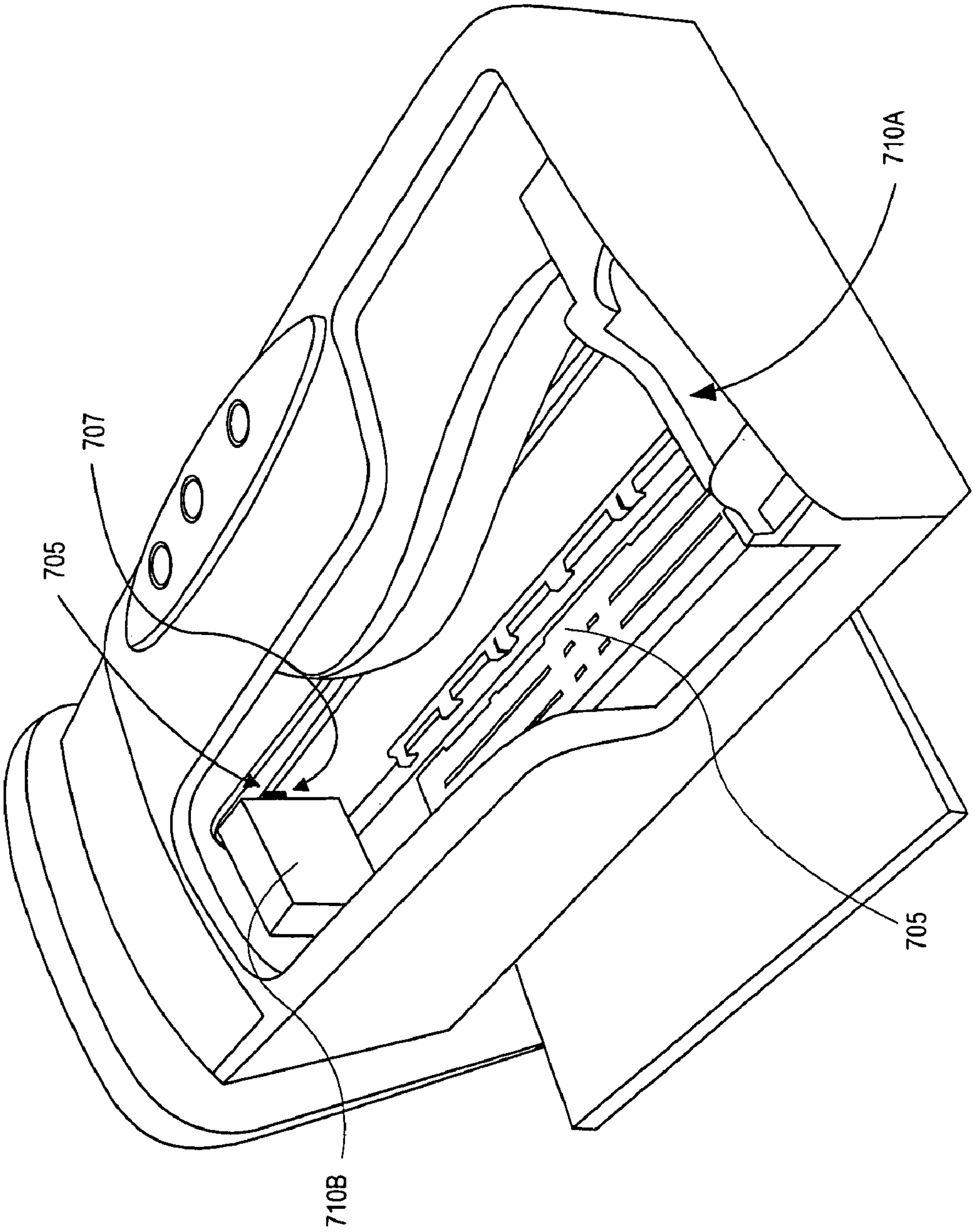
FIG. 7 illustrates one embodiment of a desktop ink jet printer.

Although discussed above with respect to high speed production printers, other ink-based printers (e.g. work group and home printers) may be include multiple print systems 240. FIG. 7 illustrates one embodiment of a desktop ink jet printer. In this embodiment, two print cartridges 710A and 710B are fitted with a clamp that attaches to a drive belt 705. A clamp 707 holds drive belt 705 tightly or releases gripping tension to allow belt 705 to freely move. When print cartridge 710A is in use its clamp holds drive belt 705 while the print cartridge 710B clamp allows belt 705 to move freely. Thus, print cartridge 710B remains in a parked position.

The above-described mechanism enables print shops to offer multiple types of ink without having to buy multiple printers and avoids any down time associated with the swapping of ink types. In addition, the mechanism enables continuous printing operation when a print head system needs to be taken offline for service and maintenance.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. An ink jet printing system comprising:
- a first print system having a first ink system to print received print jobs, including:
  - a first ink container;
  - a first set of ink lines coupled to the first ink container; and
  - a first print head coupled to the first set of ink lines;
- a second print system having a second ink system independent of the first ink system to print the print jobs, including:
  - a second ink container;
  - a second set of ink lines coupled to the second ink container; and
  - a second print head coupled to the second set of ink lines; and
- a control unit to receive the print jobs and determine which of the first and second print systems are to print each received print job.

2. The ink jet printing system of claim 1 wherein the first ink system comprises a first ink type and second ink system comprises a second ink type.

3. The ink jet printing system of claim 2 wherein the control unit selects the first ink system to perform a print job if the print job indicates that the first ink type is to be used and selects the second ink system if the print job indicates that the second ink type is to be used.

4. The ink jet printing system of claim 3 wherein the first print system and the second print system are used to print on a single page of a print job.

5. The ink jet printing system of claim 2 wherein the first ink type is a dye-based ink and the second ink type is a pigment-based ink.

6. The ink jet printing system of claim 2 wherein the first ink type is a dye-based ink and the second ink type is a custom ink.

7. The ink jet printing system of claim 2 wherein the first ink type is the same as the second ink type.

8. The ink jet printing system of claim 1 wherein the first print system is used for continuous printing while the second print system serves as a backup.

9. A network comprising:

one or more data processing systems;

a print server to receive print jobs from each of the one or more data processing systems; and an ink jet printer to receive the print jobs from the print server, having:

a first print system having a first ink system to print received print jobs, including:

a first ink container;

a first set of ink lines coupled to the first ink container; and a first print head coupled to the first set of ink lines;

a second print system having a second ink system independent of the first ink system to print the print jobs, including:

a second ink container;

a second set of ink lines coupled to the second ink container; and a second print head coupled to the second set of ink lines; and a control unit to receive the print jobs and determine which of the first and second print systems are to print each received print job.

10. The network of claim 9 wherein the first ink system comprises a first ink type and second ink system comprises a second ink type.

11. The network of claim 10 wherein the control unit selects the first ink system to perform a print job if the print job indicates that the first ink type is to be used and selects the second ink system if the print job indicates that the second ink type is to be used.

12. The network of claim 10 wherein the first ink type is a dye-based ink and the second ink type is a pigment-based ink.

13. The network of claim 10 wherein the first ink type is the same as the second ink type.

14. The network of claim 9 wherein the first print system is used for continuous printing while the second print system serves as a backup.

* * * * *